Aug. 18, 1931.  O. M. SUMMERS  1,819,979
REFRIGERATING APPARATUS SWITCH CONTROL
Original Filed May 30, 1928   2 Sheets-Sheet 1
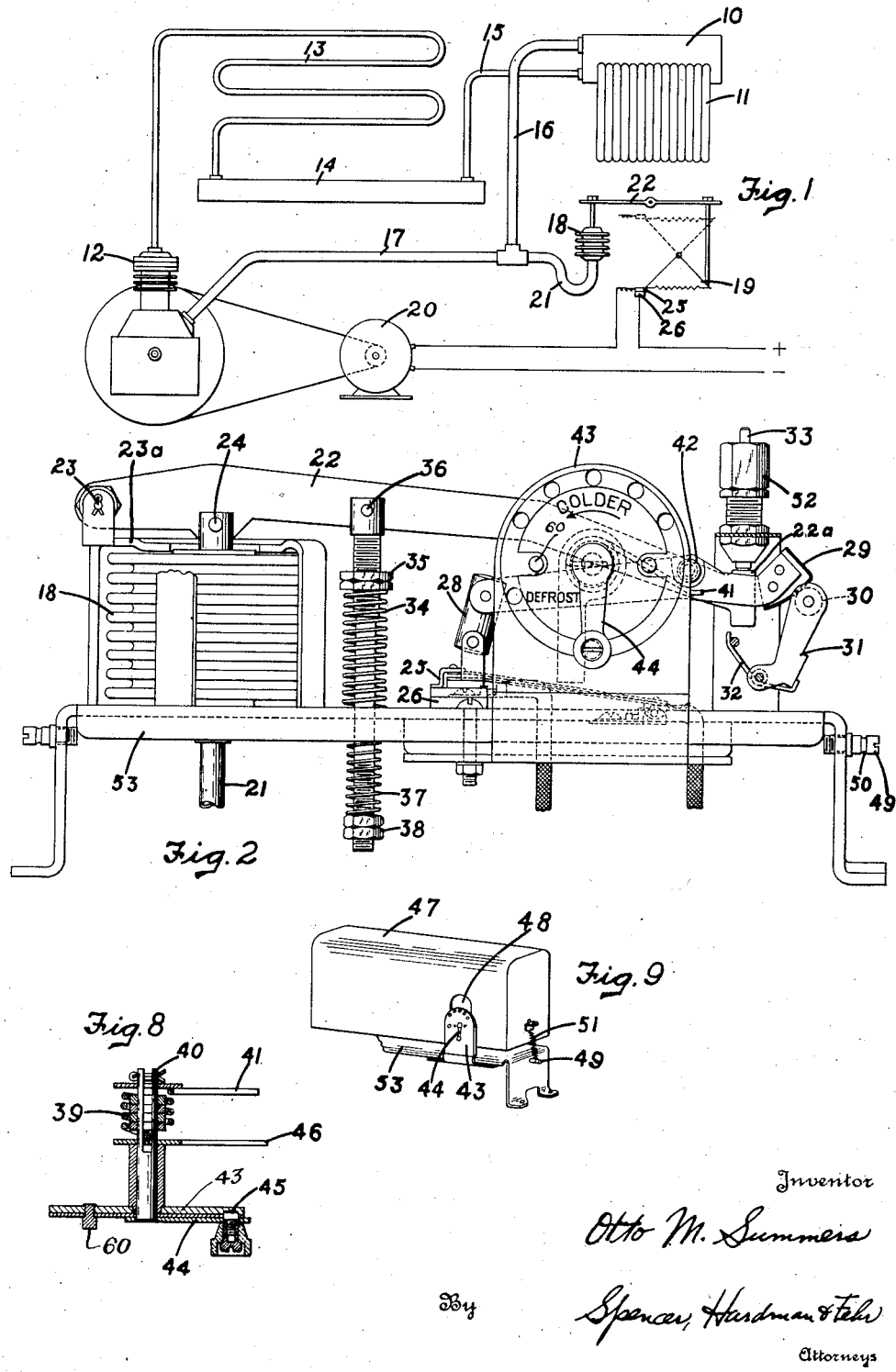

Aug. 18, 1931.   O. M. SUMMERS   1,819,979
REFRIGERATING APPARATUS SWITCH CONTROL
Original Filed May 30, 1928   2 Sheets-Sheet 2
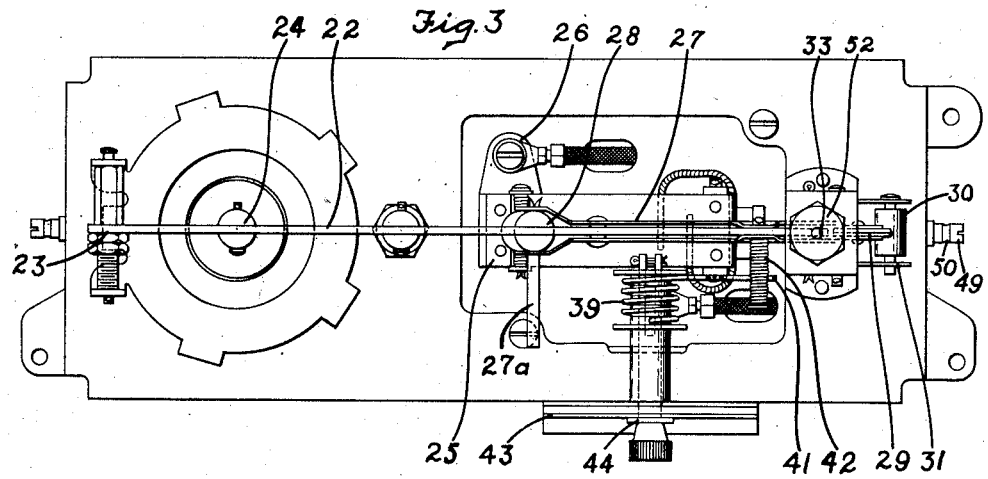
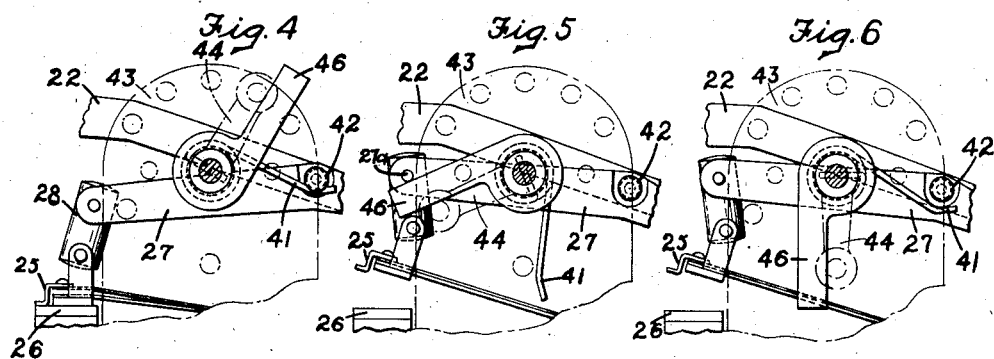
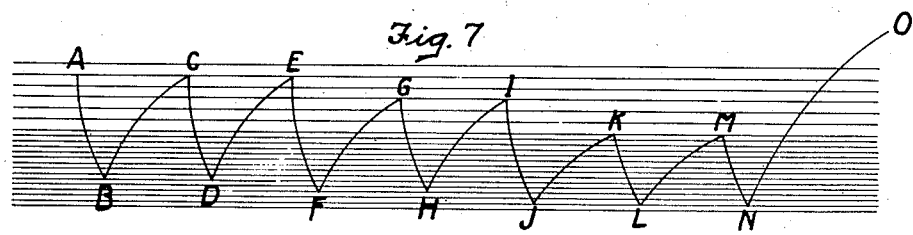
Inventor
Otto M. Summers
By Spencer, Hardman & Fehr
Attorneys Patented Aug. 18, 1931

1,819,979

UNITED STATES PATENT OFFICE

OTTO M. SUMMERS, OF DAYTON, OHIO, ASSIGNOR TO FRIGIDAIRE CORPORATION, OF DAYTON, OHIO, A CORPORATION OF DELAWARE

REFRIGERATING APPARATUS SWITCH CONTROL

Application filed May 30, 1928, Serial No. 281,599. Renewed May 5, 1931.

This invention relates to refrigerating systems and more particularly to control mechanism therefor.

It is an object of the present invention to provide an improved unitary switch for a refrigerating system in which a predetermined mean temperature is normally maintained by a control mechanism and to provide an improved switch for modifying at will the operation of the system so as to secure temporarily for a desired period of time a different mean temperature of the cooling unit and to provide means for enabling the user to restore the unit to the normal control of the control mechanism.

It is one of the objects of the invention to provide a unitary switch for a refrigerating system of the type in which a control mechanism is provided for maintaining the cooling unit of the system between predetermined temperature limits and to provide an auxiliary arrangement which may be operated so as to give a considerable range of modifications of the temperature limits normally supplied by the control mechanism.

It is another object of the invention to provide an improved switch mechanism for a refrigerating system in which an average temperature is normally maintained and to provide auxiliary mechanism controlled by a single operating member adapted to provide for quick freezing when the manual operating member is in proper position therefor and adapted to provide defrosting cycles for allowing the frost to melt off the cooling unit when the manual operating member is in proper position for causing defrosting cycles.

It is a further object to enable the user to secure such modified operation for any given number of cycles.

In carrying out these objects, it is a further object to provide a switch for a refrigerating system including a control mechanism normally adjusted to maintain a predetermined mean temperature of the cooling unit and to provide auxiliary control means for modifying the temperature of the cooling unit, which auxiliary means includes provisions for maintaining such a modified operation as long as the user so desires said modified operation until the device is manually restored to the operation for which it is calibrated to give a so called normal operation.

Further objects and advantages of the present invention will be apparent from the following description, reference being had to the accompanying drawings, wherein a preferred form of the present invention is clearly shown.

In the drawings

Fig. 1 shows a refrigerating circuit embodying the improved control of the invention;

Fig. 2 is a side view showing the control device;

Fig. 3 is a top view of the control device;

Figs. 4, 5, and 6 show the control device adjusted for producing various modifications of normal operation;

Fig. 7 shows a graph indicating the cyclic operation of the refrigerating system as modified by manipulations of the control device;

Fig. 8 shows a detail of the manually controlled element of the control device, and Fig. 9 illustrates a suitable form of protective housing for the control device.

In the mechanical type of refrigerator which is represented diagrammatically by the circuit shown in Fig. 1, it is desired to maintain normally a predetermined temperature in a refrigerating element or cooling unit. Such an element is usually arranged to provide a space for holding substances to be frozen, and has associated therewith means for cooling the remainder of the cabinet in which it is mounted so as to provide both a freezing zone and a cooling zone. In the form of apparatus chosen for illustrating the preferred embodiment of the invention, the refrigerating element comprises an evaporating chamber 10 to which a number of ducts 11 are attached in circulatory relation. Refrigerant such as sulphur dioxide is supplied to this element by means of a compressor 12 which forces the refrigerant into a condenser 13 and thence into a receiver 14 from which it passes from pipe 15 through a float controlled valve, not shown, into the evaporating chamber 10. The refrigerant, after boiling off in the evaporator 10 and coils 11 and performing its refrigerating effect in the well known manner, is circulated to the compressor through pipes 16 and 17. A suitable mechanism is provided for controlling the operation of the system, and, for the purpose of illustrating the invention, it is shown herein as a switch which is responsive to pressure conditions prevailing within the evaporator 10. This switch may have in its preferred form a flexible or expansible chamber 18 such as a metallic bellows, the movement of which, in response to the pressure variations in the system, causes the making and breaking of an electric circuit at the point 19 so as to start and stop the motor 20 which is used for driving the compressor.

The control device, consisting of the bellows 18 and switch 19, is arranged so as normally to maintain a predetermined temperature in the refrigerating elements 10 and 11. However, it may in some cases be desirable to obtain for a definite period, a different temperature, and hence it is desirable to make provisions for modifying the operation of the control device so as to adapt it to cause the refrigerating element to produce such a desired temperature.

Thus, for example, while the elements 10 and 11 may be adjusted for cooling food to a certain degree and even for freezing the same by sufficiently prolonged exposure to such a degree of cold, it may sometimes be desired to hasten the freezing process, and hence adjusting means is provided for modifying the control means so that such hastening or quick freezing is effected.

By means of the control system of the invention, it is possible to secure a plurality of ranges of temperature at will by the simple interposition of a modifying device into the normal operation of the control device as a whole.

Referring in detail to the drawings, the control mechanism comprises a pressure operated device such as a switch which is adapted to make and break the circuit of the electric motor driving the compressor. The operation of the pressure control switch is modified by a resilient adjusting means which is normally set for cyclically producing a desired temperature in the refrigerating element and is also provided with an auxiliary adjusting means independent of the first means and adapted to be positioned manually and whose function is to modify the action of the first means when desired. The pressure responsive means consists of a hollow metallic bellows 18 which is sealed at the top and which is connected at the bottom by means of pipe 21 to the circuit of the refrigerating system. An operating member or lever 22, pivoted on ears 23 of an elevated platform 23a, is adapted to follow the movements of the bellows 18 by being pivoted therewith as at 24.

The operation of the lever 22 causes the switch contacts 25 and 26 to be brought into contact with each other or separated as shown in Figs. 4, 5, and 6 where this operation is effected by means of a double beam lever 27 which straddles lever 22 and is pivoted thereto by the pin 42. The lever 27 is connected to the switch contacts 25 by means of a link 28. The other end of the lever 27 is provided with a cam 29 for the purpose of providing a snap action.

The snap action of the contact 25 with respect to 26 is produced by a cam system which includes the hardened steel nose 29 against which a hardened steel roller 30 is biased by a carrier 31 and spring 32. This structure is described in detail in the copending application of Otto M. Summers, Serial No. 123,420, filed July 19, 1926.

As the pressure builds up within the flexible metallic bellows 18, the latter expands and since the lever 22 is pivoted to this bellows as at 24 and fulcrumed to the supporting frame of the device as at 23, it is evident that the bellows will raise the operating lever 22. The upward movement of the lever is, however, resisted by a yieldable adjusting system comprising a coil spring carried within an adjustable casing 52 and bearing against a plunger 33 which acts against the extremity 22a of the lever 22. When the pressure decreases and the bellows 18 collapse, the downward movement of the lever will be resisted by a coil spring 34 whose tension may be regulated by nuts 35 carried on a threaded arm pivoted to the lever 22 as at 36. Balancing spring 37 adjusted by nuts 38 may be used on the opposite side of the base 39 of the device for assisting the tension of spring 34. The spring 34 and the resilient adjusting system comprising plunger 33 and adjustable cap 52 are preferably so adjusted as to produce what may be termed "normal" predetermined adjustment, that is, a pressure corresponding to a particular temperature which is ordinarily suitable for every-day operation of the refrigerator in which the system is used.

The extremity 22a of the lever 22 bears against the plunger 33 only on the upward action of the lever 22. After the lever 22 begins to descend, the extremity 22a does not touch the plunger 33. Thus the plunger 33 affects the starting pressure but not the stopping pressure. The cap 52 is therefore a starting adjustment.

This temperature may be sufficient to cool food stuffs stored in the usual freezing compartments of the refrigerating element or in the compartments of the cabinet cooled thereby provided the food is left exposed to this temperature long enough. However, if it is desired to hasten the action of freezing the food stuffs it is evident that the normal operation of the device must be disturbed or modified in some way so that the refrigerator is temporarily maintained at a lower temperature.

The apparatus is usually adjusted at the factory or in the field by the service man for such normal operation by suitably tensioning the springs 34 and the resilient adjusting system 52 and 33 and in such condition the lever 22 will have its upward and downward movements resisted that it will open and close the circuit of the driving motor 20 only at the maximum and minimum pressure-temperature points for which the tension corresponds. It is evident that by interposing a resistance to the downward descent to the lever 22 the operation of the switch contacts will be delayed so that the system will continue operating for a longer period of time, thus prolonging the freezing cycle of the system. Likewise, if the resistance to the downward descent of the lever 22 is increased it will require a greater effort on the part of the diaphragm 18 to pull the lever down into contact breaking position (the descent of lever 22 causing the raising of contact 25 away from contact 26, thus breaking the circuit).

A suitable method of interposing such a resistance is illustrated in the embodiment of the present invention and consists in placing a resilient obstruction in the path of the downwardly moving lever 22. Preferably a spring is used for this purpose and in the preferred embodiment of the invention the spring as shown in dotted lines in Fig. 2 and in greater detail in Fig. 8 comprises a coiled spring 39 hooked into and carried by a slotted lever 40 so arranged that one end of the spring 41 projects while the body of the spring is forced to rotate with the lever 40 when the same is turned. The pin 42 which may be grooved as shown in Fig. 3 and is engaged by the spring in such a manner that when the lever 22 descends, the pin 42 engaging the spring leg 41 will have its downward descent resisted to an extent corresponding to the degree to which the spring 39 is wound.

The spring 39 carried by the rod 40 may be rotated and wound up so that a correspondingly greater tension is caused to bear against the anvil 42 and therefore against the downward descent of the lever 22. Thus, if the spring as shown in Fig. 2 is wound in the position indicated by the arrow beneath the word "colder" more and more tension may be exerted against the descent of the lever 22. Various degrees of tension may be secured, ranging from a maximum to a minimum and while any intermediate point between these extremities may be selected as a position at which to station the spring or wind the spring, in a device suitable for manipulation, it is preferable to have a selected series of stations to which the spring may be wound. Thus, as shown in Fig. 3, a disc, plate, or dial 43 is provided having points represented by holes at which the spring may be stopped in its rotation or winding. The rod 40 which carries the spring is carried in turn by an operating handle 44 which lays over the dial 43 and which may be located in any position by having a button 45 or the like snap into a given hole in the dial. This snap action or locking arrangement may be provided by so proportioning the slot in the rod 40 that a lateral shifting of the spring carrier may be effected with the aid of the resiliency of the spring itself.

The dial 43 may have the holes thereon represent various points of tension of the spring calibrated in terms of points at which the apparatus is to be turned on or off.

The resilient modifying device just described is so arranged that the leg 41 of the spring tends normally to interpose a minimum resistance to the descent of the lever 22. This position is shown in Fig. 2 where the spring carrying pointer or arm 44 is in the "normal" operating position. In this position, the adjusting means controlled by the pointer or arm 44 is practically inoperative with respect to its effect upon the movement of the operating lever 22 and the opening and closing of the switch contacts. This is therefore called an inoperative position of the pointer or arm 44. In Fig. 4 the spring carrying pointer or arm is shown snapped into the third hole (proceeding counter-clockwise) and it is evident that an appreciable drag is presented to the lever 22. This is therefore called an operative position of the pointer or arm 44. The result of this retardation of the downward descent of the lever 22 will be to cause a prolongation of the freezing cycle, in other words a longer-than-normal operation of the compressor.

It is evident that the duration of this longer-than-normal operation of the compressor will be increased as the spring is further tensioned, that is, as the spring-carrying receiver or arm 44 is moved to successive operative positions in the counter-clockwise direction indicated by the arrow beneath the word "colder".

After the refrigerator has been in operation for an appreciable period, a considerable amount of frost will collect around the coils and act substantially as an insulator.

In order to defrost the refrigerating element, it is necessary to shut down the operation or discontinue the operation of the compressor and this is effected by completely blocking the movement of the control mechanism as by interposing an obstruction to the downward movement of the lever 27. For this purpose a blocking arm 46 is provided on the spring-carrying arrangement shown in Fig. 8. By moving the arm 44 into the position marked "defrost" and shown in Fig. 5, the apparatus will continue to defrost since the arm 44 arrests the downward movement of the extension of the pin 27a of arm 27. Since in this position the pointer or arm 44 controls mechanism affecting the opening and closing of the switch contacts, this is also called an operative position of the pointer or arm 44.

Fig. 6 shows the normal position of the switch and corresponds to Fig. 2 except that it is a cross section immediately behind the plate 43. The operation of the device may be explained graphically by the curves in Fig. 7. These graphs in which the closely spaced lines represent vacuum in inches of mercury and the widely spaced lines represent pounds in pressure per square inch, indicate the conditions of temperature or pressure existing in the refrigerating system as plotted against cycles or time.

Means for preventing the movement of the adjustment device beyond safe limits may be provided. In this particular embodiment, a stop member 60 may be placed on the dial 43. This stop member prevents complete revolution of the arm 44, and thus prevents movement of the spring parts, such as spring 39, beyond their elastic limit or beyond their intended tension range.

The normal cyclic operation of the system is indicated by the curve ABCDE in which the point B represents the point at which the switch opens to stop the compressor and the slope BC the warming up period, and C the point at which the switch cuts in to start the compressor, the same being true of the points C and D and the slope represented thereby.

If, now, the spring is wound so as to interpose more resistance to the descent of the lever 22 as by placing the pointer into one of the "colder" stages, the compressor will cut out at the point F and cut in at the point G, the points H and I corresponding respectively to points F and G since two cycles of each colder point are shown for illustration. It is to be noted that the compressor cuts out at the point F which is lower than the point D and cuts in at the point G which is lower than the point E of the previously mentioned graphs. This means that the pressure within the system must be reduced to a greater degree and hence the temperature must be lower before the switch stops the compressor and also that the pressure and hence the temperature at which the switch starts the compressor is also lower as shown by G and I.

If the pointer is moved to a still colder position, the curves J K L M and N will be produced in which the points J and L are lower than the previous points F and H which means that a still lower pressure and therefore a still lower temperature is produced and the points K and M are lower than the corresponding points G and I which means that the compressor will start at a lower pressure and hence temperature.

If now the pointer is set to the point marked "Defrost" where the lever 27 is completely barred from movement by the arm 46, the curves N and O are produced which means that the apparatus is not operating but is gradually warming up and will continue warming up until the compressor is permitted to work by manual shifting of the arm or pointer and a release of the spring. During this warming up, the frost on the machine melts away.

In order to protect the device, a casing is provided therefor. This improved casing comprises a cover preferably made of sheet metal and indicated by 47 in Fig. 9. It is provided with an arcuate portion cut away as indicated at 48 which is adapted to slide over the dial or plate 43. The plate 43 is preferably mounted directly and carried by the base 53 of the frame of the control device. Suitable locking means or retaining means including a catch 49 having a groove 50 is provided on the base 39 and cooperates with a suitable means such as a spring catch 51 to hold the cover in place upon the base 39. By this arrangement, since the dial 43 rigidly carried by the base and since the cover 47 is removably without necessitating dismantling of the dial, it is evident that the control device may be inspected and if necessary adjusted without dismantling the same.

The switch herein disclosed is a unitary structure adapted to be installed as a unit in a mechanical refrigerator. In this self-container unit, means are provided for changing temporarily the temperatures at which the refrigerator operates, and means are also therein provided for carrying out the defrosting operation.

While the form of embodiment of the invention as herein disclosed constitutes a preferred form, it is to be understood that other forms might be adopted, all coming within the scope of the claims which follow.

What is claimed is as follows:

1. In a pressure responsive switch for a refrigerating system, a platform, a pressure responsive element mounted on said platform, electric contacts and snap action mechanism interposed between said contacts and pressure responsive element and mounted on said platform, a device with manual operating means mounted on said platform and normally independent of said snap action mechanism, but operable to modify said snap action mechanism to vary the pressures at which said mechanism is responsive without disturbing the normal adjustment of said switch, said device being provided with means operable at will for maintaining open said contacts to provide a defrosting operation for said refrigerating system.

2. In a pressure responsive switch for refrigerating systems, a pressure responsive element, electric contacts, snap action mechanism interposed between said element and contacts and independent quick adjustment change means supported on a unitary support, said change means including a manually rotatable shaft carrying a spring coiled around said shaft and having an extension adapted to abut said snap action mechanism to provide a quick adjustment change for said mechanism normally independent from said mechanism.

3. In a pressure responsive switch for refrigerating systems, a pressure responsive element, electric contacts, snap action mechanism interposed between said element and contacts, and independent quick adjustment change means supported on a unitary support, said change means including a manually rotatable shaft carrying a spring coiled around said shaft and having an extension adapted to abut said snap action mechanism to provide a quick adjustment change for said mechanism normally independent from said mechanism, said shaft also having a rigid member adapted to abut said mechanism to provide independent quick adjustment for defrosting said refrigerating system.

4. In a pressure responsive switch for refrigerating systems, a pressure responsive element, electric contacts, snap action mechanism interposed between said element and contacts and including levers having common pivot means and independent quick adjustment change means supported on a unitary support, said change means including a manually rotatable shaft carrying a spring coiled around said shaft and having an extension adapted to abut said snap action mechanism at said common pivot means to provide a quick adjustment change for said mechanism normally independent from said mechanism.

5. In a pressure responsive switch for refrigerating systems, a pressure responsive element, electric contacts, snap action mechanism interposed between said element and contacts and including levers having common pivot means and independent quick adjustment change means supported on a unitary support, said change means including a manually rotatable shaft carrying a spring coiled around said shaft and having an extension adapted to abut said snap action mechanism at said common pivot means to provide a quick adjustment change for said mechanism normally independent from said mechanism, said shaft also having a rigid member adapted to abut said mechanism to provide independent quick adjustment for defrosting said refrigerating system.

6. In a pressure responsive switch for a refrigerating system, a pressure responsive element, electric contacts and snap action mechanism interposed between said contacts and pressure responsive element, a device with manual operating means and normally independent of said snap action mechanism, but operable to modify said snap action mechanism to vary the pressures at which said mechanism is responsive without disturbing the normal adjustment of said switch, said device being provided with means operable at will for maintaining said contacts in a predetermined position independently of the actuation by said pressure responsive element.

7. In a pressure responsive switch for a refrigerating system, a pressure responsive element, electric contacts and snap action mechanism interposed between said contacts and pressure responsive element and including a lever, a device with manual operating means and normally independent of said snap action mechanism but provided with spring means adapted to be brought in contact with said lever to modify said snap action mechanism to vary the pressures at which said mechanism is responsive without disturbing the normal adjustment of said switch, said device being provided with a relatively rigid member operable at will for maintaining open said contacts to provide a defrosting operation for said refrigerating system.

8. In a pressure responsive switch for a refrigerating system, a pressure responsive element, electric contacts and snap action mechanism interposed between said contacts and pressure responsive element and including a lever, a device with manual operating means and normally independent of said snap action mechanism but provided with spring means adapted to be brought in contact with said lever to modify said snap action mechanism to vary the pressures at which said mechanism is responsive without disturbing the normal adjustment of said switch, said device being provided with means operable at will for maintaining said contacts in a predetermined position independently of the actuation by said pressure responsive element.

9. An automatic switch for controlling a refrigerating system including a set of switch contacts, means for operating said switch contacts responsive to certain conditions of said refrigerating system, and means for varying the operation of said switch contacts, said last mentioned means including manual operating means having a plurality of operating positions, means controlled by said manual operating means when in one operative position for resisting the opening of the switch contacts, and means controlled by said manual operating means when in another operative position, said means being adapted to resist the closing of the switch contacts.

10. An automatic switch for controlling a refrigerating system including a set of switch contacts, means for operating said switch contacts responsive to certain conditions of said refrigerating system, and means for varying the operation of said switch contacts, said last mentioned means including manual operating means having a plurality of operative positions, means controlled by said manual operating means when in one operative position for moving said contacts into open position, and means controlled by said manual operating means when in a plurality of other selective operative positions for resiliently urging said switch contacts into closed position, each of said last mentioned selective operative positions providing a different degree of resilient urging of said switch contacts into closed position.

11. An automatic switch for controlling a refrigerating system including a set of switch contacts, means for causing said switch contacts to open and close with a snap action, pressure responsive means for cyclically opening and closing said switch contacts for normal operation, and means for varying the normal operation of said switch including a manual operating means having a plurality of operative positions and an inoperative position for normal operation, means controlled by said manual operating means when in one operative position for prolonging the cycle in which said switch contacts are in closed position, and means controlled by said manual operating means when in another operative position, said means being adapted to prolong the cycle in which said switch contacts are in open position.

12. An automatic switch for controlling a refrigerating system including a set of switch contacts, means for operating said switch contacts responsive to certain conditions of said system, auxiliary means for varying the operation of said operating means, said auxiliary means including a manual operating means having a plurality of operative positions and an inoperative position, means controlled by said manual operating means when in one operative position for urging said switch contacts into closed position, and means controlled by said manual operating means when in another operative position for preventing the closing of said switch contacts.

13. An automatic switch for controlling a refrigerating system including an electric circuit comprising contacts adapted to be moved from a closed position to an open position, a manually controlled element for moving said contacts from one position to another and for retaining the same in the position in which the contacts are moved, and means for opening and closing the circuit operable in response to temperature changes, said manually controlled element being movable also to a plurality of selective positions for selectively varying the operation of said means.

14. An automatic switch for controlling a refrigerating system including an electric circuit, comprising contacts adapted to be moved from a closed position to an open position, a manually controlled element for retaining said contacts in open position, and means for opening and closing the circuit operable in response to temperature changes, said manually controlled element being movable also to a plurality of selective positions for selectively varying the operation of said means.

15. The combination of a control structure for a refrigerating system including an electric circuit, of means responsive to the temperature of the refrigerating system for automatically opening and closing the circuit, and a manually operable control element movable to a plurality of selective positions to vary said means responsive to the temperature of the refrigerating system and adapted for movement to another position for rendering said first means ineffective.

16. The combination of a control structure having an electric circuit cutout, pressure responsive means for automatically opening and closing the circuit, adjustable means to vary the pressure necessary to have said pressure responsive means operate, and a manual control element movable to a plurality of selective positions for changing the effect of said means and movable to open the circuit and movable to close the circuit.

17. In combination with a switch structure and a pressure responsive element, said switch structure including a movable switch member operatively connected with said pressure responsive element and adapted to open and close a circuit through said switch structure depending on the pressure applied to the pressure responsive element, resilient means for adjusting the range of the switch structure for modifying the action thereof, a single control for said last means, said control being movable and being operative to close and open the switch structure in different positions of its movement.

18. An automatic device for controlling a refrigerating system including an electric switch structure for initiating and terminating operation of the system, means for operating said switch structure responsive to certain conditions of said refrigerating system, and means for varying the operation of said switch structure, said last mentioned means including a manual operating means having a plurality of operative positions, said first operating means when in one position serving to move said switch structure into closed position and said manual operating means when in a plurality of other selective positions adapted to urge said switch structure into closed position thereby changing the operation of the switch structure, said manual operating means when in still another position adapted to cause said switch structure to be in open position.

19. In a refrigeration apparatus, a combined automatic and manually operable control therefor comprising means responsive to the temperature of the apparatus to automatically start and stop the apparatus at a predetermined setting with a fixed differential between starting and stopping, and manually operable means for changing in the same direction the points of automatic starting and stopping of the apparatus at a different predetermined setting of said manually operated means, said last means also serving to render said apparatus inoperative.

20. The combination of a control structure for a refrigerating system including an electric circuit, of means responsive to the temperature of the refrigerating system for automatically opening and closing the circuit at a given low and high degree of temperature, and a manually operable control element movable to a plurality of selective positions to vary said means responsive to the temperature of the refrigerating system for changing in the same direction both points of temperature where the circuit automatically will be opened and closed, and said control element being movable to open the circuit and movable to close the circuit for rendering the control operative or inoperative.

21. A combined automatically and manually operable device for controlling a refrigerating system comprising a switch structure, of means responsive to the temperature of the refrigerating system for normally causing the automatic operation of said switch structure between predetermined high and low temperature limits, and manual means cooperable with said switch structure for lowering both said high and low temperature limits at which said switch structure automatically operates and for moving said switch structure to open circuit position where it cannot be closed by the automatic means.

In testimony whereof I hereto affix my signature.

OTTO M. SUMMERS.